April 6, 1937.  A. ROTH  2,075,911
INTERNAL COMBUSTION ENGINE
Filed Oct. 9, 1933  2 Sheets-Sheet 2
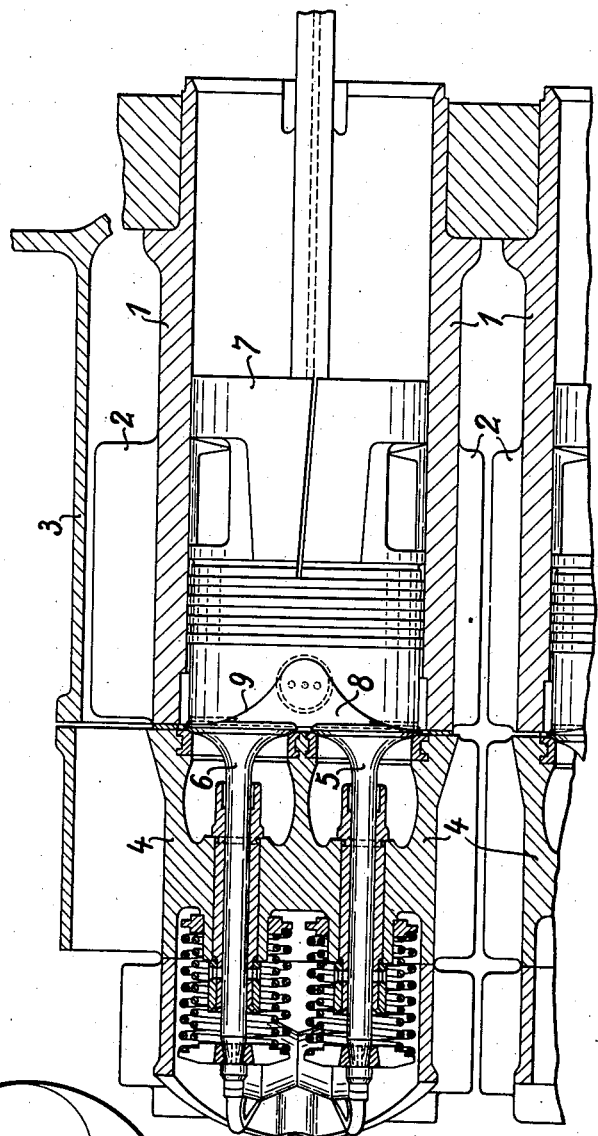
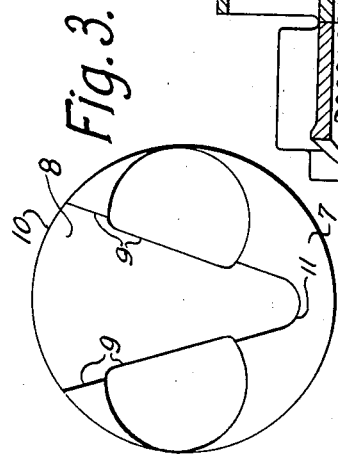

Patented Apr. 6, 1937

2,075,911

UNITED STATES PATENT OFFICE 2,075,911

INTERNAL COMBUSTION ENGINE

Adolf Roth, Essen, Germany, assignor to Fried. Krupp Aktiengesellschaft, Essen-on-the-Ruhr, Germany Application October 9, 1933, Serial No. 692,885
In Germany November 1, 1932

2 Claims. (Cl. 123—32)

The invention relates to internal combustion engines and has more particularly reference to Diesel engines.

The invention has for its primary object an improved Diesel engine and, further, to provide means for converting a Diesel engine into an internal combustion engine operating with low compression, such as a carburetor engine in which the mixture is compressed.

The invention has for its further object a Diesel engine adapted to drive any vehicle. It relates more particularly to an air-cooled engine of this kind fitted with an antechamber for the ignition, with the object to secure the best possible combustion.

A further object of the invention is to render as simple as possible the conversion from one into the other type of engine.

With these ends in view, the invention primarily consists in the fact that a fuel feeding device, such as an antechamber body, is mounted in the wall of the working cylinder of the Diesel engine in the range of the top dead center transversely of the axis of the cylinder.

The invention further consists in the fact that the fuel feeding device, that is the antechamber body, of the Diesel engine is adapted to be replaced by a spark plug or a corresponding member as used in low compression engines operating on a carbureted mixture.

The invention is of great importance when applied to air-cooled internal combustion engines. In engines of this type, in the case of an antechamber Diesel engine, the current of cooling air for the working cylinder also cools at least a part of the antechamber body and, in the case of a Diesel engine with direct fuel injection, the injection nozzle is cooled in a corresponding manner.

In order that the invention may be clearly understood and more readily put into practice, it is explained hereinafter with reference to the accompanying drawings which show a horizontal Diesel engine provided with an antechamber, this engine being obtained by converting a low compression engine in accordance with the principle of the invention. In the drawings:

Figure 2 is a section on line II—II of Figure 1, and

Fig. 3 is a plan view of the head of the piston shown in Figs. 1 and 2.

Figure 1:
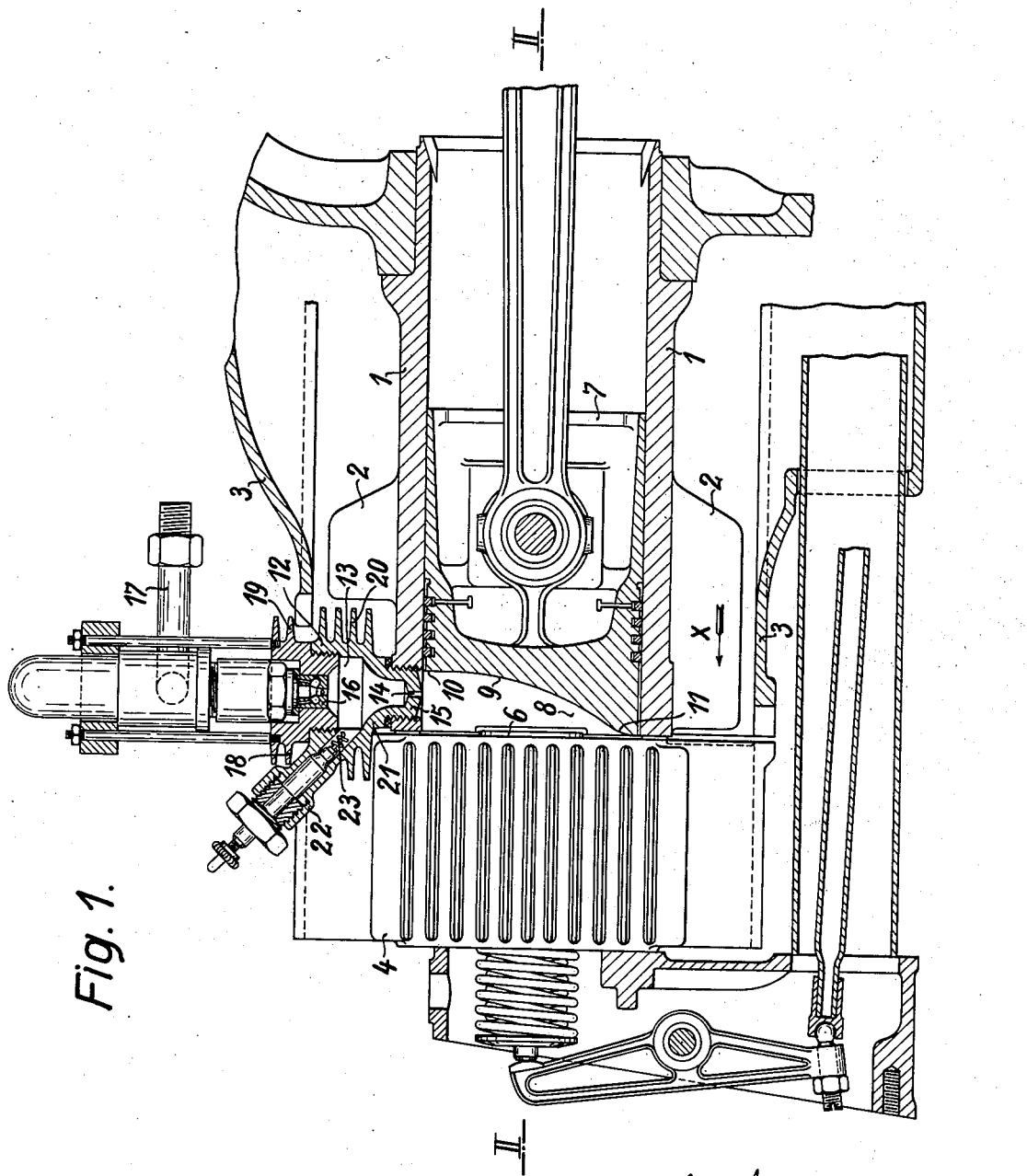
Figure 1 is a central longitudinal section of the engine.

The reference numeral 1 denotes the horizontal working cylinder of a low compression engine. The cylinder 1 is provided at its outer end with cooling ribs 2 extending parallel to the longitudinal axis of the cylinder. The cooling ribs 2 are surrounded by a casing 3 through which air is forced in the direction of arrow x, Figure 1, by means of a fan (not shown) mounted on the crank shaft of the engine. On the outer end of the cylinder 1 there is mounted a cylinder head 4 in which an admission valve 5 and an outlet valve 6 are provided. As far as disclosed in the foregoing, this engine is conventional.

The working piston 7 of the engine differs from the normal piston of a low compression engine by the smaller clearance space 8 existing between it and the cylinder head 4 when the piston is at the top dead center position. To this end the piston 7 has a trough-shaped indentation 9 on its top face, see also Figure 2, which extends in the direction of a diameter of piston 7. The indentation 9 has the greatest depth at its uppermost end 10 and gradually decreases in depth and width toward the opposite point 11 of the piston down to zero. In line with the longitudinal axis of the indentation 9 is arranged a two-part antechamber body 12 which is removably mounted in the cylinder wall 1 instead of the sparking plug or other suitable ignition means usual with low compression engines. The antechamber contained in the body 12 is of oblong shape and is confined on its end turned toward the cylinder 1 by a partition 15 in which a number of passages, such as 14, for example three, are provided. On its opposite end a fuel nozzle 16 opens into the antechamber 13, which nozzle forms the end of a fuel duct 17 fed by means of a suitable fuel pump (not shown). The fuel nozzle 16 is mounted in a body 19 provided with transverse ribs 18 and screwed into another body 21 which is formed with the wall 15 and likewise is provided with transverse ribs 20. The two parts 19 and 21 form together the antechamber body 12. The part 21 further is formed with a socket 22 directed toward the wall 15 and having mounted in it an ignition device, for example a spark plug 23, which serves to secure the ignition of the fuel in the antechamber 13 upon starting, that is, when the engine is still cold. The passages 14 in the partition 15 are arranged in a plane transverse to the axis of the working piston 7, that is, in a vertical plane normal to the direction of motion of the piston 7. The location of the passages 14 in juxtaposition and, further, at half the depth of the indentation 9 of the piston 7 has for its object to secure uniform mixing with the air contained in the space 8 of the jets supplied through the passages 14 and oversaturated with fuel. The volume of the antechamber 13 and that of space 8 are in the proportion of about 1:4 and the ratio of compression is about 1:13. Overheating of the antechamber body 12, especially with full load, is prevented by guiding the current of cooling air for the working cylinder 1 so that it flows over at least those cooling ribs 20 of the antechamber body 12 which lie in the range of the working cylinder 1. By selectively applying antechamber bodies fitted with a larger or smaller number of ribs 18 and 20, respectively, the heat condition of the antechamber 13 can be adapted to the sort of fuel used.

As will be seen from Figure 2, several cylinders 1 may be provided in juxtaposition. It is further of advantage to provide symmetrically the same number of working cylinders on the other side of the crank shaft. Furthermore, as a matter of course, instead of three passages 14, as in the embodiment illustrated, more or less passages may be provided. These passages, further, need not be circular but can have any other suitable cross section, such as square, rectangular, or oblong cross section. Finally, the cross section of the passages 14 may enlarge or taper from the antechamber 13 toward the cylinder 1, or first enlarge and then taper.

The described engine operates in the four stroke cycle and can be used with advantage for the drive of any vehicles. In the first inward stroke of the piston 7 pure air is sucked into the cylinder 1 through the valve 5. On the return stroke of the piston this air is compressed up to about 35 atmospheres above atmospheric and in part pressed into the antechamber 13. When the piston 7 is in the top dead center position, fuel is injected into the highly heated antechamber 13 through the nozzle 16 and is ignited in part by the air existing therein. This causes an increase of pressure in the antechamber 13 with the result that the content of the latter enters the space 8 through the passages 14, where it meets the likewise very hot air and causes an intimate intermingling of the fuel particles with this air. This results in a complete and quick combustion of the fuel. Thereupon follow the usual expansion and exhaust strokes.

If the described antechamber Diesel engine is to be converted into a carburetor engine, such as one fitted with spark plug ignition and compression of the mixture, apart from the obvious replacement of the fuel feeding device by a carburetor and of the highly compressing piston 7 by a piston causing a low compression of about 1:5, nothing is required, but to replace the antechamber body 12 by a spark plug.

This easy convertibility brings about the remarkable improvement that the cylinder body 1 with the cylinder cover 4 can be used without any alteration for the manufacture of both types of engine.

If the Diesel engine is to be used as a fuel jet injection engine, that is, as an engine in which the fuel is injected immediately into the working cylinder, then, in addition to the alterations indicated above, merely the spark plug is exchanged for a fuel injection nozzle usual with Diesel engines.

It may further be stated that in converting the Diesel engine into a low compression engine even the exchange of the piston can be avoided by adjusting the degree of compression required in the special case by altering the distance of the cylinder head from the cylinder. This can be accomplished, for example, by interposing between these two parts rings of different height.

What I claim and desire to secure by Letters Patent is:

1. In a Diesel engine for vehicles, a cylinder and reciprocating piston defining a combustion chamber, the walls defining said combustion chamber when the piston is at inner dead center being shaped to confine said combustion chamber to a trough-shaped cavity extending from a relatively large unrestricted mouth opening toward one side of the cylinder, across the head of the cylinder toward the opposite side, said cavity diminishing in both heighth and breadth in the direction away from its mouth, a fuel feeding device comprising a precombustion chamber mounted in an aperture in the lateral wall of the cylinder in position to discharge a jet of fuel into the mouth of said cavity in the direction of the axis of the cavity.

2. In a Diesel engine for vehicles, a cylinder and reciprocating piston defining a combustion chamber, the walls defining said combustion chamber when the piston is at inner dead center being shaped to confine said combustion chamber to a trough-shaped cavity extending from a relatively large unrestricted mouth opening toward one side of the cylinder, across the head of the cylinder toward the opposite side, said cavity diminishing in both heighth and breadth to substantially zero, in the direction away from its mouth, and a fuel feeding device mounted in an aperture in the lateral wall of the cylinder in position to discharge a jet of fuel into the mouth of said cavity in the direction of the axis of the cavity.

ADOLF ROTH.